United States Patent
Ramon-Gimenez et al.

(10) Patent No.: US 10,385,240 B2
(45) Date of Patent: Aug. 20, 2019

(54) ACRYLATE-TERMINATED URETHANE POLYBUTADIENES FROM LOW-MONOMER 1:1 MONOADDUCTS FROM REACTIVE OLEFINIC COMPOUNDS AND DIISOCYANATES AND HYDROXY-TERMINATED POLYBUTADIENES FOR LIQUID OPTICALLY CLEAR ADHESIVES (LOCAS)

(71) Applicant: Evonik Degussa GmbH, Essen (DE)

(72) Inventors: Laura Ramon-Gimenez, Essen (DE); Niko Haberkorn, Dorsten (DE); Kai-Steffen Krannig, Dortmund (DE); Nicolai Kolb, Recklinghausen (DE); Hsin-Ho Wu, Hsinchu County (TW); Juergen Steiger, Taipei (TW); Tung-Yi Sun, Taipei (TW)

(73) Assignee: Evonik Degussa GmbH, Essen (DE)

( * ) Notice: Subject to any disclaimer, the term of this patent is extended or adjusted under 35 U.S.C. 154(b) by 301 days.

(21) Appl. No.: 15/375,225

(22) Filed: Dec. 12, 2016

(65) Prior Publication Data

US 2017/0174956 A1    Jun. 22, 2017

(30) Foreign Application Priority Data

Dec. 21, 2015    (EP) ................................... 15201636

(51) Int. Cl.
| | | |
|---|---|---|
| C09J 109/00 | (2006.01) | |
| C08F 136/06 | (2006.01) | |
| C09J 5/06 | (2006.01) | |
| C08G 18/75 | (2006.01) | |
| C08F 290/06 | (2006.01) | |
| C09D 175/16 | (2006.01) | |
| C09J 175/16 | (2006.01) | |

(52) U.S. Cl.
CPC ........... *C09J 109/00* (2013.01); *C08F 136/06* (2013.01); *C08F 290/067* (2013.01); *C08G 18/755* (2013.01); *C09D 175/16* (2013.01); *C09J 5/06* (2013.01); *C09J 175/16* (2013.01); *C08F 2810/40* (2013.01); *C08G 2190/00* (2013.01); *C09J 2205/31* (2013.01)

(58) Field of Classification Search
CPC ....... C09J 175/16; C09D 175/16; C08G 18/69
See application file for complete search history.

(56) References Cited

U.S. PATENT DOCUMENTS

| | | | |
|---|---|---|---|
| 3,855,379 | A | 12/1974 | Araki |
| 4,020,125 | A | 4/1977 | Suzuki et al. |
| 4,127,543 | A | 11/1978 | Patzchke |
| 4,192,684 | A | 3/1980 | Gensho et al. |
| 4,202,696 | A | 5/1980 | Miyoshi et al. |
| 8,253,329 | B2 | 8/2012 | Kostka et al. |
| 8,822,600 | B2 | 9/2014 | Hashimoto |
| 8,841,479 | B2 | 9/2014 | Spyrou et al. |
| 2001/0005738 | A1* | 6/2001 | Bruchmann ........... C07C 271/20 525/123 |
| 2002/0049349 | A1* | 4/2002 | Kohlstruk ........... C08G 18/8175 560/25 |
| 2005/0026075 | A1* | 2/2005 | Fujimaki ............... B41C 1/1008 430/270.1 |
| 2007/0179254 | A1* | 8/2007 | Wang .................. C08G 18/3206 525/440.072 |
| 2011/0076491 | A1 | 3/2011 | Lu et al. |
| 2011/0251424 | A1* | 10/2011 | Spyrou .............. C08G 18/8108 560/336 |
| 2014/0343186 | A1* | 11/2014 | Cui ........................ C09J 165/00 522/42 |
| 2015/0240009 | A1* | 8/2015 | Hashimoto ........ C08G 18/6208 525/262 |
| 2016/0311949 | A1 | 10/2016 | Haberkorn et al. |
| 2016/0342254 | A1 | 11/2016 | Motohashi et al. |

FOREIGN PATENT DOCUMENTS

| | | | |
|---|---|---|---|
| BR | 8101674 | | 7/2003 |
| CA | 1253289 | A1 | 4/1989 |
| CN | 102703019 | A | 10/2012 |
| CN | 104231996 | A | 12/2014 |
| DE | 2244918 | A1 | 3/1973 |
| DE | 2702708 | A1 | 8/1977 |
| DE | 2737174 | A1 | 4/1978 |
| DE | 2821500 | A1 | 11/1978 |
| EP | 2367864 | B1 | 10/2012 |
| EP | 2910578 | A1 | 8/2015 |
| GB | 1575584 | A | 9/1980 |
| JP | 60151260 | A | 8/1985 |
| JP | 60195150 | A | 10/1985 |
| JP | 2002371101 | A | 12/2002 |
| JP | 2003155455 | A | 5/2003 |
| JP | 2008291114 | A | 12/2008 |
| JP | 2010265402 | A | 11/2010 |
| JP | 2015071682 | A | 4/2015 |
| JP | 2015147916 | A | 8/2015 |
| WO | WO-2014061251 | A1 * | 4/2014 ......... C08G 18/6208 |
| WO | 2014196415 | A1 | 12/2014 |
| WO | 2015169644 | A1 | 11/2015 |

OTHER PUBLICATIONS

Machine Translation of CN 102703019 A. (Year: 2018).*
Kazunari Ishiura, "Isoprene polymer compositions as adhesives for polyolefins," Abstract, copyright Jun. 1992, Chemical Abstracts Service, vol. 116, No. 15 (1 page).
Search Report dated Jun. 9, 2016 in EP 15 201 636.6 (6 pages).
Search Report dated May 16, 2017 in EP 16 201 111.8 (7 pages).

* cited by examiner

*Primary Examiner* — Michael M Dollinger
(74) *Attorney, Agent, or Firm* — Philip P. McCann; Nexsen Pruet PLLC

(57) ABSTRACT

The present invention relates to an optical clear resin and a method for producing a liquid optical clear photo-curable adhesive.

22 Claims, No Drawings

ACRYLATE-TERMINATED URETHANE POLYBUTADIENES FROM LOW-MONOMER 1:1 MONOADDUCTS FROM REACTIVE OLEFINIC COMPOUNDS AND DIISOCYANATES AND HYDROXY-TERMINATED POLYBUTADIENES FOR LIQUID OPTICALLY CLEAR ADHESIVES (LOCAS)

This application claims the benefit of European Application No. 15201636.6 filed on Dec. 21, 2015, the disclosure of which is expressly incorporated herein by reference.

FIELD

The invention relates to the use of acrylate-terminated urethane polybutadienes from low-monomer 1:1 monoadducts from reactive olefinic compounds and diisocyanates and hydroxy-terminated polybutadienes for liquid optically clear adhesives (LOCAs).

BACKGROUND

Production of acrylate-terminated urethane polybutadienes has been described in the patent literature since the end of the 1960s. Japan Soda describes the preparation of these types of functionalized polybutadienes in numerous patents, such as DE1944015. Similar products have also been mentioned in U.S. Pat. No. 3,855,379, DE2244918A1, JP49117588A, JP49117595A, JP50153088A, JP50153091A, JP50150792A, GB1575584A, DE2702708A1, DE2737174A1, DE2821500A1, JP56060441A, BR8101674A, JP59021544A, CA1253289A1, JP60195150A, JP60151260A, JP61006155A, JP61021120A, JP60195038A, and JP61123649A. The use of tin catalysts was published in JP2002371101A, while patents EP2910578A1 and U.S. Pat. No. 8,822,600B2 describe the use of organoaluminum, organozinc, and, by analogy, organobismuth and organozirconium as catalysts. With catalysts such as these, viscosity does not rise much as a function of time, giving them an advantage over catalysts that contain Sn. New acrylate-terminated urethane polybutadienes with previously unknown properties remain in demand today.

Acrylate-terminated urethane polybutadienes are used as adhesion promoters in optical devices (JP2015147916A, WO2014196415), in OCRs (optically clear resins) (JP2015071682A), in sealing compounds (JP2010265402A), in insulating coatings (JP2008291114A), as pressure-sensitive adhesives (PSAs) (US 20110076491 A1, JP2003155455), in optical fibers (19, JP06021138B), resins for pressure plates (JP010283658 and DE2702708B2), etc. There is very little in the literature, however, on the use of acrylate-terminated urethane polybutadienes in optical applications for electronics—especially in LOCAs.

Optically clear adhesives and especially liquid optically clear adhesives are finding wide applications in optical displays. Optical bonding in display applications is used to bond optical elements such as display panels, glass plates, touch panels and flexible films such as polarizers and retarders, especially the use of such adhesives for bonding in touch displays, for example, capacitive touch display is high interest. The importance of optically clear adhesives is still growing since the continuous development of new electronic display products, such as wireless reading devices, increases the demands for optically clear adhesives.

For some applications, like OLEDs, it is further desirable to have an adhesive which shows low outgassing. For example, U.S. Pat. No. 8,253,329 mentions that small molecules that are outgassed from adhesives can potentially damage the OLED device when the adhesive is in direct contact with the OLED device. Hence, it is technically desirable to use for such adhesives materials, especially oligomers, with a low amount of low molecular weight side products and hence lower outgassing.

WO 2014/196415 A1 describes a photocurable resin and a photocurable resin composition. The therein described formulations have a monomer content of 50% per weight that will not allow to make a formulation that is able to be used to realize cured films with low modulus and high flexibility. In addition, the use of high monomer contents in formulations very often lead to haze, yellowing and shrinkage issues that negatively affect the appearance of the films.

CN104231996 A discloses an optically transparent compound comprising a polybutadiene-polyether block copolymer in order to improve the yellowing, haze and shrinkage properties. However, this oligomer is reducing the overall adhesion of the formulation system. Hence it is technically desired to have a formulation that does not require the use of a polybutadiene polyether acrylate in order to reach low yellowing, haze and shrinkage.

In order to accelerate curing CN102703019 proposes to use thiol compounds in liquid optical transparent plastics. However, such thiol compounds are known to lead to issues in respect to high yellowing and therefore have a negative effect on the optical properties.

JP2003155455 describes formulations for pressure sensitive adhesives (PSA). For such PSAs it is common practice to use solvents to lower the viscosity of the composition and to make the material processable. If the formulation disclosed by this citation is used in a liquid optically clear adhesive (LOCA), it will lead to high yellowing and low flexibility. In order to improve these two properties it is necessary to add a liquid rubber, which will lead to issues regarding compatibility and haze.

There are no descriptions in the literature on the use of acrylate-terminated urethane polybutadienes from low-monomer 1:1 monoadducts from reactive olefinic compounds and diisocyanates and hydroxy-terminated polybutadienes for liquid optically clear adhesives (LOCAs).

For many optical applications—and especially for LOCAs—low formulation viscosity is key, as it makes the materials easier to apply. It is the objective of the present invention to provide formulations based on acrylate-terminated urethane polybutadienes with lower solution viscosity than that of prior art formulations.

STATEMENT OF INVENTION

Summary

The use of acrylate-terminated urethane polybutadienes from low-monomer 1:1 monoadducts from reactive olefinic compounds and diisocyanates and hydroxy-terminated polybutadienes would solve this problem.

Surprisingly, it has been found that the solution viscosity of formulations containing acrylate-terminated urethane polybutadienes from low-monomer 1:1 monoadducts from reactive olefinic compounds and diisocyanates and hydroxy-terminated polybutadiene was lower than that of classic acrylate-terminated urethane polybutadienes.

DETAILED DESCRIPTION

The first object of the present invention is the use of acrylate-terminated urethane polybutadienes 1) in formulations in combination with at least one liquid component 2), wherein the acrylate-terminated Urethane polybutadienes 1) are obtained by reaction of
- A) at least one low-monomer 1:1 monoadduct with a free diisocyanate content below 2.0 wt. % from
  - a1) at least one aliphatic, cycloaliphatic, and/or araliphatic diisocyanate and
  - a2) at least one reactive olefinic compound having at least one methacrylate group and/or acrylate group and/or vinyl ether group and exactly one OH group
and
- B) at least one hydroxy-terminated polybutadiene and/or one at least partially or completely hydrogenated hydroxyterminated polybutadiene
- C) optionally in the presence of at least one polymerization inhibitor.

In a preferred embodiment of the present invention the formulation is a liquid optically clear adhesive.

The ratio of the NCO groups of component A) to the OH groups of component B) ranges between 1.2:1 and 1:40, preferably between 1.2:1 and 1:10, and most preferably between 1.1:1 and 1:3.

The NCO content of the acrylate-terminated urethane polybutadienes in the present invention is <0.5 wt. %, preferably less than 0.2 wt. %, and most preferably less than 0.1 wt. %.

In the present invention, conversion of low-monomer 1:1 monoadducts and hydroxy-terminated polybutadienes yields products in which the solution viscosity of the formulation is more than 10% lower, preferably more than 15% lower, and most preferably more than 20% lower than that of the state of the art.

The term "liquid optically-clear adhesives" (LOCA) is well established in the art and well known to the person skilled in the art. Liquid optically-clear adhesives (LOCA) are widely used in touch panels and display devices to bind the cover lens, plastic or other optical materials to the main sensor unit or to each other. Liquid optically-clear adhesives are generally used to improve the optical characteristics of the device as well as to improve other attributes such as durability. The liquid optically clear photo-curable adhesive is generally used for example to band the touch panel to the main liquid crystal display, and also to band any protective cover, such as the lens, to the touch panel. Major applications of liquid optically clear photo-curable adhesive include capacitive touch panels, 3D televisions and glass retarders.

The term "optically clear" means that the material exhibits a transmittance higher than 99% when 15 glass is used as a blank or higher than 90% when air is used as a blank measured following the DIN 5033.

The low-monomer-content 1:1 monoadducts A), having a free diisocyanate content of less than 2 wt. %, can be prepared for example according to a method as disclosed in EP 2 367 864, from, as starting compounds,
- a1) at least one aliphatic, cycloaliphatic and/or araliphatic diisocyanate in an amount of 1-20 mol, and
- a2) 1 mol of at least one reactive olefinic compound having at least one methacrylate group and/or acrylate group and/or vinyl ether group and exactly one OH group, obtained by reaction in a temperature range of 40-120° C., the unreacted diisocyanate being separated off subsequently by a short-path distillation at 80-220° C./0.01-10 mbar from the reaction product, characterized in that the short-path distillation takes place in the presence
- a3) of at least one inhibitor which possesses at least one functional group reactive toward NCO groups.

The low-monomer-content 1:1 monoadducts A) of diisocyanates a1) and reactive olefinic compounds a2), having a free diisocyanate content of less than 2 wt. % are obtained in principle by reaction of 1-20, preferably 1-5 mal, more preferably 1.5-4 mal, of diisocyanate a1) with 1 mol of a reactive olefinic compound a2) in a temperature range of 40-120° C., preferably 40-80° C., the reaction being carried out until conversion of the reactive olefinic compound a2) is complete, and the unreacted diisocyanate being subsequently separated by a short-path distillation at 80-220° C. and a pressure of 0.01-10 mbar from the reaction product. The inhibitor a3) can be added before or during or after the reaction.

The unreacted diisocyanate is separated off by a short-path distillation, preferably using thin-film evaporators or falling film evaporators. The distillation takes place at 80-220° C., preferably at 100-180° C., and a pressure of 0.01-10 mbar, preferably 0.05-5 mbar. The short path evaporator may be, for example a glass enamel or metal apparatus. The thus obtained low-monomer. 1:1 monoadducts have a content of monomeric diisocyanates of less than 2 wt. %, preferably less than 0.5 wt. %.

If the reaction is carried out in a solvent, this solvent is removed before the residual monomer content is separated off.

Suitable isocyanates a1) are aliphatic, cycloaliphatic, and araliphatic—i.e., aryl-substituted aliphatic-diisocyanates, as are described in, for example, Houben-Weyl, Methoden der organischen Chemie, Volume 14/2, pages 61-70 and in the article by W. Siefken in Justus Liebigs Annalen der Chemie 562, 75-136, such as 1,2-ethylene diisocyanate, 1,4-tetramethylene diisocyanate, 1,6-hexamethylene diisocyanate (HDI), 2,2,4-trimethyl-1,6-hexamethylene diisocyanate (TMDI), 2,4,4-trimethyl-1,6-hexamethylene diisocyanate (TMDI), 1,9-diisocyanato-5-methylnonane, 1,8-diisocyanato-2,4-dimethyloctane, 1, 12-dodecane diisocyanate, ω,ω'-diisocyanatodipropyl ether, cyclobutene 1,3-diisocyanate, cyclohexane 1,3-diisocyanate, cyclohexane 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-(1,4-methano-naphthalen)-2,5-ylenedimethylene diisocyanate, decahydro-8-methyl-(1,4-methano-naphthalen)-3,5-ylenedimethylene diisocyanate, hexahydro-4,7-methanoindan-1,5-ylenedimethylene diisocyanate, hexahydro-4, 7-methanoindan-2,5-ylenedimethylene diisocyanate, hexa-hydro-4, 7-methanoindan-1,6-ylenedimethylene diiso-cyanate, hexahydro-4, 7-methanoindan-2,5-ylenedimethylene diisocyanate, hexahydro-4,7-methanoindan-1,5-ylene diisocyanate, hexahydro-4,7-methanoindan-2,5-ylene diisocyanate, hexahydro-4,7-methanoindan-1,6-ylene diisocyanate, hexahydro-4, 7-methanoindan-2,6-ylene diisocyanate, 2,4-hexahydrotolylene diisocyanate, 2,6-hexahydrotolylene diisocyanate, 4,4'-methylenedicyclohexyl diisocyanate (4,4'-H12MDI), 2,2'methylenedicyclohexyl diisocyanate (2,2'-H12MDI), 2,4-methylenedicyclohexyl diisocyanate (2,4-H12MDI) or eise mixtures, 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2, 3,5,6-tetramethylbenzene, 2-methyl-1,5-diisocyanatopentane (MPDI), 2-ethyl-1,4-diisocyanatobutane, 1, 10-diisocyanatodecane, 1,5- diisocyanatohexane, 1,3-diisocyanatomethylcyclohexane, 1,4-diisocyanatomethylcyclohexane, and any desired mixtures of these compounds.

Further suitable isocyanates are described in the aforementioned article in the Annalen on page 122 f. Also suitable are 2,5-bis(isocyanatomethyl)bicyclo[2.2.1]heptane (NBDI) and/or 2,6-bis(isocyanato-methyl)bicyclo[2.2.1]heptane (NBDI), in each case as the pure substance or as a mixed component. It is of course possible to use mixtures of above mentioned isocyanates.

The preparation of these diisocyanates is nowadays carried out generally either by the phosgene route or via the urea process. The products of both methods are equally suitable for use in the process of the invention.

With particular preference, generally speaking, the aliphatic and cycloaliphatic diisocyanates that are readily accessible industrially, such as IPDI, HDI, and H12MDI, for example, and also their isomer mixtures, are used.

Suitable reactive olefinic compounds a2) are all compounds which carry not only at least one methacrylate or acrylate function or vinyl ether group but also exactly one hydroxyl group. Further constituents may be aliphatic, cycloaliphatic, aromatic or heterocyclic alkyl groups. Oligomers or polymers are also conceivable.

Preference is given to readily accessible products such as, for example, hydroxyethyl acrylate, hydroxypropyl acrylate, hydroxybutyl acrylate, and hydroxyethyl methacrylate, hydroxypropyl methacrylate, hydroxylbutyl methacrylate, glycerol diacrylate, pentaerythritol triacrylate, trimethylolpropane diacrylate, glycerol dimethacrylate, pentaerythritol trimethacrylate, and trimethylolpropane dimethacrylate, and also hydroxyl-ethyl vinyl ether, hydroxypropyl vinyl ether, hydroxylbutyl vinyl ether, hydroxypentyl vinyl ether, and hydroxyhexyl vinyl ether. Mixtures as well can of course be used. Particularly preferred is hydroxyethyl acrylate.

Incorporable inhibitors a3) possess nonaromatic, NCO-reactive functional groups, preferably hydroxyl, thiol or amine groups, which are able to form covalent bonds with isocyanates. Reactive functional groups of this kind that are attached to aromatic groups do also react with NCO groups, but are generally eliminated again under the distillation conditions and are therefore not suitable for incorporation. Suitable compounds, therefore, are all those which are in customary commercial use as polymerization inhibitors (see section below), but in addition still possess nonaromatic, isocyanate-reactive groups, preferably hydroxyl, thiol or amine groups. The reactive functional groups are preferably attached to an aliphatic or cycloaliphatic hydrocarbon radical. Such compounds are described in U.S. Pat. No. 4,260,832 and GB 226 47 08, for example. Those contemplated include, for example, 3,5-di-tert-butyl-4-hydroxybenzyl alcohol, 3-(3,5-di-tert-butyl-4-hydroxyphenyl)propanol, 4-(3,5-d i-tert-butyl-4-hydroxyphenyl)butanol, 5-(3, 5-di-tert-butyl-4-hydroxyphenyl)pentanol, 6-(3,5-di-tert-butyl-4-hydroxyphenyl)hexanol, 3-tert-butyl-5-methyl-4-hydroxy-benzyl alcohol, 3-(3,5-di-tert-butyl-4-hydroxyphenyl) propanol, 4-(3-tert-butyl-5-methyl-4-hydroxyphenyl) butanol, 5-(3-tert-butyl-5-methyl-4-hydroxyphenyl) pentanol, 6-(3-tert-butyl-5-methyl-4-hydroxyphenyl) hexanol, 3,5-di-tert-butyl-4-hydroxybenzyl alcohol, 3 (3,5-di-tert-butyl-4-hydroxyphenyl)propanol, 4-(3,5-dimethyl-4-hydroxyphenyl)butanol, 5-(3,5-dimethyl-4-hydroxyphenyl)pentanol, 6-(3,5-dimethyl-4-hydroxyphenyl)hexanol, alone or in mixtures. Preference is given to using 3,5-di-tert-butyl-4-hydroxybenzyl alcohol.

The presence of further commercially customary polymerization inhibitors (antioxidants) is advantageous.

According to the present invention, above mentioned low-monomer-content 1:1 monoadducts A) are reacted with hydroxyl terminated polybutadienes 8).

The polybutadiene B) can be selected from any kind of hydroxyl terminated polybutadienes known to a person skilled in the art. The polybutadiene can as well be at least partially or completely hydrogenated.

The polybutadiene B) used according to the invention is preferably polybutadiene having terminal hydroxyl groups, where the polybutadiene comprises the 1,3-butadiene-derived monomer units

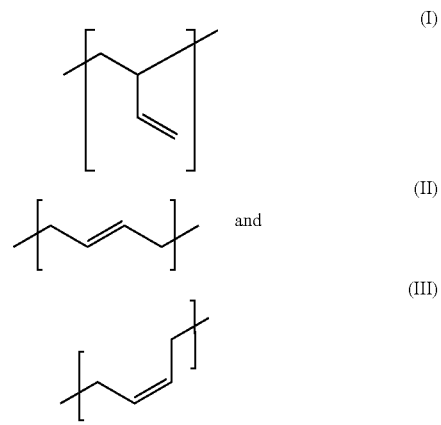

where the proportion of (I) in the entirety of the 1,3-butadiene-derived monomer units present in the polybutadiene is from 10 to 60 mol percent, and where the sum of the proportions of (II) and (III) in the entirety of the 1,3-butadiene-derived monomer units present in the polybutadiene is from 40 to 90 mol percent.

The abovementioned preferred polybutadiene having hydroxyl groups is produced by free-radical polymerization of 1,3-butadiene, in each case comprising the 1,3-butadiene-derived monomer units (I), (II) and (III) present in the polybutadiene, where a square bracket in the formula representation selected in this application for the 1,3-butadiene-derived monomer units (I), (II) and (III) present in the polybutadiene indicates that the band at the respective square bracket is not terminated by way of example by a methyl group, and that, instead, the corresponding monomer unit is bonded by way of this band to another monomer unit or another functional group, in particular a hydroxyl group or epoxy group. The arrangement here can have the monomer units (I), (II) and (III) in any desired sequence in the polymer. A random arrangement is preferred.

In one preferred embodiment, the proportion of (1), (II) and (III) in the entirety of the 1,3-butadiene-derived monomer units present in the polybutadiene is in each case and mutually independently at least 10 mol percent.

It is particularly preferable that the proportion of A in the entirety of the 1,3-butadiene-derived monomer units present in the polybutadiene is from 15 to 30 mol percent, the proportion of B in the entirety of the 1,3-butadiene-derived monomer units present in the polybutadiene is from 50 to 70 mol percent and the proportion of C in the entirety of the 1,3-butadiene-derived monomer units present in the polybutadiene is from 15 to 30 mol percent.

The medium molecular weight, measured with GPC, of the hydroxyl terminated polybutadienes typically lies in the range between 500 and 10,000 g/mol, preferably in the range between 1000 and 5,000 g/mol, particularly preferred in the range between 1,500 and 4000 g/mol. Measurement of molecular weight via GPC is well known and widely adopted in the relevant art.

In measurements within the disclosure of the present invention, polystyrene having a narrow molecular weight distribution may be used as standard, for example, and tetrahydrofuran may be used as the mobile phase.

In one preferred embodiment, there can also be other monomer units present alongside the 1,3-butadiene-derived monomer units (1), (II) and (III) present in the polybutadiene, in particular monomer units not derived from 1,3-butadiene. In a most preferred embodiment, however, the entirety of the 1,3 butadiene-derived monomer units (1), (II) and (111) present in the polybutadiene represents a proportion of at least 80 mol percent, preferably 90 mol percent, more preferably 95 mol percent, most preferably 100 mol percent, of the entirety of the monomer units, comprising the 1,3-butadiene-derived units and other units, incorporated into the polymer.

The abovementioned preferred hydroxyl terminated polybutadienes B) are produced by radical polymerization of 1,3-butadiene in presence of hydrogen peroxide, water and an organic solvent. Suitable processes are described for example in EP 2 492 292.

Polybutadienes B) that can be preferably used according to the present invention are commercially available, e.g. as POLYVEST® HT from Evonik Resource Efficiency GmbH.

The reaction of polyisocyanates with reactive hydroxy-terminated polybutadienes entails the reaction of the free NCO groups with hydroxyl groups, and has already been frequently described (EP 0 669 353, EP 0 669 354, DE 30 30 572, EP 0 639 598 or EP 0 803 524). This reaction may take place either with but also without solvent. It is carried out generally in a temperature range between 40 and 120° C., preferably 40 and 80° C., and can be catalyzed advantageously by common catalysts known within urethane chemistry, such as, for example, organometallic compounds, such as dibutyltin dilaurate (DBTL), dibutyltin dineodecanoate, zinc octoate, or bismuth neodecanoate, for example; and also tertiary amines, e.g., triethylamine or diazobicyclooctane, etc. Suitable reaction assemblies include all customary apparatus, tanks, static mixers, extruders, etc., preferably assemblies which possess a mixing or stirring function. The NCO/OH ratio is 1.2:1 to 1:40, preferably 1.2:1 to 1:10, and more preferably 1.1:1 to 1:3.

The reaction of component A) and B) can be done in the 'presence of at least one commonly known polymerization inhibitor, which can be added before or during the reaction. It is also possible to subsequently add the polymerization inhibitor in order to stabilize the acrylate terminated urethane polybutadienes. It also possible to use mixtures of different polymerization inhibitors.

Suitable inhibitors include for example phenolic, Quinine-containing, P-containing, S-containing or NO-containing inhibitors. Examples are catechol, 4-methoxyphenol, 4-tert-Butyloxyphenol, 4-benzyloxyphenol, alpha-naphthol, beta-naphthol, phenothiazine, 10-10-dimethyl-9, 10-dihydroacridin, bis [2-hydroxy-5-methyl-3-cyclohexylphenyl] methane, bis [2-hydroxy-5-methyl-3-tert-butylphenyl] methane, hydroquinone, pyrogallol, 3,4-dihydroxy-1-tert-butylbenzene, 4-methoxy-2(resp. 3)-tert-butylphenol (BHA), BHA in combination with bis [2-carboxy-iethyl] sulphide (TDPA), 4-methyl-2,6-di-tert-butylphenol (BHT), bis [4-hydroxy-2-methyl-5-tert-butylphenyl] sulfide, 4-Butyl mercaptomethyl-2, 6-di-tert-butylphenol, 4-hydroxy-3,5-di-tertbutyl-phenylmethansulfonsäure-dioctadecyl-ester, 2,5-dihydroxy-1-tert-butylbenzene, 2,5-dihydroxy-1,4-di-tert-butylbenzene, 3,4-dihydroxy-1-tert-butylbenzene, and 2,3-dimethyl-1,4-bis[3,4-dihydroxyphenyl]-butane. Also all conventional organic or inorganic compounds containing NO are possible.

The phenolic antioxidants may also be combined with phosphorous esters in accordance with the formula below, where X is oxygen or sulfur, and where R1, R2 and R3 represent identical or different alkyl, alkylen-(1)-yl, aryl or aralkyl radicals having in each case 1-20 C atoms.

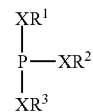

The phenolic antioxidants may also be combined with thioethers or amines, such as, for example, 2-anilino-naphthalene (PBN), 1-anilinonaphthalene (PAN) or 1,4-di-anilinobenzene. It is of course also possible to use typical commercial substances which on the basis of their chemical structure combine two or more polymerization-inhibiting principles, such as 2,2'-thiobis(4-tert-octylphenol), for example. Preferred are phenothiazine, 2,6-di-tert-butyl-4-(4, 6-bis(octylthio)-1,3,5-triazin)-2-ylaminophenol, and 4-methyl-2, 6-di-tert-butylphenol and 4,4'-methylenebis-2, 6-di-tert-butylphenol.

The present invention further provides formulations, preferably adhesive formulations that can be used as liquid optically clear adhesives (LOCA), comprising
  1) acrylate terminated urethane polybutadienes, wherein the acrylate terminated urethane polybutadienes are obtained by reaction of
    A) at least one low-monomer-content 1:1 monoadduct, having a free diisocyanate content of less than 2 wt. %, the monoadduct being based an at least one aliphatic, cycloaliphatic and/or aralipathic diisocyanate a1) and at least one reactive olefinic compound having at least one methacrylate group and/or acrylate group and/or vinyl ether group and exactly one OH group a2), and
    B) at least one hydroxyterminated polybutadiene and/or one at least partially or completely hydrogenated hydroxyterminated polybutadiene
    C) optionally in the presence of at least one polymerization inhibitor and
  2) at least one liquid component selected from plasticizer and/or reactive (meth)acrylates, and
  3) optionally photo-polymerization initiators.

Formulations according to the present invention have the advantages of high liquid optical transparency, higher flexibility, high compatibility, high thermol stability, lower shrinkage and lower dielectricity compared to formulations known to a person skilled in the art. The better flexibility of the invention results in improved bondings to thin screens or large screens combined with the avoidance of deformation due to stress generated by the screen.

Formulations according to the present invention at least comprise the acrylate terminated urethane polybutadienes 1) and at least one liquid component 2) selected from plasticizer and/or reactive (meth)acrylates.

Formulations according to the present invention preferably comprises acrylate terminated urethane polybutadienes 1) in amounts from 10 to 80% by weight, more preferably from 20 to 70% by weight, especially preferred from 30 to 60% by weight, based an the total weight of the formulation of the invention.

Preferably the formulation of the present invention is an adhesive formulation, more preferably a liquid optically-clear adhesive.

According to a preferred embodiment of this invention the plasticizer comprises polyisoprene resin, polybutadiene resin, hydrogenated polybutadiene, xylene polymer, hydroxyl-terminated polybutadiene and/or hydroxyl-terminated polyolefin. Terpene polymer resin, phthalates, trimellitates, adipates, benzoate ester, hexanoate and/or dicarboxylate can be used as well. Of course other specialty plasticizers, which are available on the market, can also be used.

Suitable plasticizers like the polyisoprene resin, polybutadiene resin, hydrogenated polybutadiene, xylene polymer and so on may preferably have a number average molecular weight (Mn) of 50 to 50,000 g/mol and preferably a functionality of 0 to 1. Functionality means here the functional group which can participate in the curing reaction of acrylate, such as acrylate double band. Hydroxyl group does not count as a functionality in this case.

Preferred polyisoprene resin and/or, polybutadiene resin, which can be used in this invention are for example Polybutadiene Polybd45CT, Polybd2000CT, Polybd3000CT, CN307 available from Sartomer Company Inc, Exton, Pa. Polyisoprene LIR-30, LIR-50, LIR-290 available from Kuraray Co. Ltd, Tokyo, Japan can preferably be used, too. Polybutadiene TEA-1000, TE2000, G1-1000, G1-2000, G1-3000, B1-2000, B1-3000, JP-100, available from Nippon Soda Co Ltd, Tokyo, Japan can preferably be used, too. B1-2000, for example, is a hydrogenated 1,2-polybutadiene homopolymer with a number average molecular weight of around 2100. G1-2000, for example, is a hydroxy-terminated hydrogenated 1,2-polybutadiene, with a number average molecular weight of around 2100.

Other preferred plasticizers for example include Palatinol 81 OP, Palatinol DPHP, Plastomoll DNA from BASF Corporation, NJ, USA, and Admex 523 Polymerie Plasticizer, Admex 6996 Polymerie Plasticizer, TEG-EH plasticizer (Triethylene Glycol Bis (2-EthylHexanoate)), DOP plasticizer (Bis(2-Ethylhexyl) Phthalate) from Eastman Chemical Company, TN, USA.

Other preferred plasticizer is chosen from PB-950, PB-1300, PB-1400, PB-2000 and PB-2400, etc., that can be purchased from Daelim Corporation; Indopol Polybutene L50, H-7, H-8, H-35, H-50, H-100, H-300, H-1200, H-1500, H-1900, H-2100 and H-6000 and the like that can be purchased from BP, are also preferred. Combinations of plasticizers, for example combination of Triethylene Glycol Bis(2-EthylHexanoate) and polybutadiene resin, are preferred.

Adhesive formulations according to the present invention preferably comprises plasticizer in amounts of more than 10% by weight, more preferably from 20 to 80% by weight, especially preferred from 30 to 70% by weight, based on the total weight of the formulation of the invention.

In a preferred embodiment of the present invention, the adhesive formulations further comprises reactive (meth)acrylates. According to a preferred embodiment of this invention the reactive (meth)acrylates are chosen from methyl (meth)acrylate, ethyl (meth)acrylate, n- or iso-propyl (meth)acrylate, n- or iso- or tert-butyl (meth)acrylate, 2-(2-ethoxyethoxy) ethyl acrylate, tetrahydrofurfury (meth)acrylate, lauryl acrylate, isooctyl acrylate, isodecyl acrylate, 2-phenoxyethyl acrylate, 2-ethylhexyl (meth)acrylate, isobornyl (meth)acrylate, dicyclopentenyloxyethyl (meth)acrylate, dicyclopentadienyl (meth)acrylate, 2-hydroxyethyl (meth)acrylate, 2-hydroxypropyl (meth)acrylate, 2-hydroxybutyl (meth)acrylate, caprolactone acrylate, morpholine (meth)acrylate, hexanediol di(meth)acrylate, ethyleneglycol dimethacrylate, trimethylolpropane triacrylate, pentaerythritol tetraacrylate and combinations thereof.

It is also possible to apply an acrylate oligomer, which preferably has a T9 value from −80° C. to 100° C. The acrylate oligomer can preferably be made from (meth)acrylic monomers and can preferably have a weight average molecular weight (Mw) within the range of about 1000 to 15000 g/mol. A preferred weight average molecular weight (Mw) can be around 2000 g/mol.

In general, (meth)acrylate refers to both acrylate and methacrylate functionality. In general, "acrylate" refers to both acrylate and methacrylate functionality. "Acrylic ester" refers to both acrylic ester and methacrylic ester functionality.

Adhesive formulations according to the present invention preferably comprises reactive (meth)acrylates in amounts from 0 to 30% by weight, more preferably from 5 to 30% by weight, especially preferred from 10 to 25% by weight, based on the total weight of the formulation of the invention.

In a further preferred embodiment of the present invention, the adhesive formulations additionally comprises photo-polymerization initiators 3). The photoinitiator is used to initiate the photopolymerization of components of the formulations of the present invention, and to accelerate the photo-curing speed of the adhesive composition. The adhesive composition of the invention preferably contains a free radical photoinitiator. The photoinitiators used in the present invention are not particularly limited and, for example, benzil ketals photoinitiators, hydroxyketones photoinitiators, aminoketones photoinitiators and acyl phosphine peroxides photoinitiators can be used.

The specific examples of the benzil ketals photoinitiators include for example commercially obtained IRGACURE 651 (chemical name: 2,2-dimethoxy-1,2-diphenyl-ethan-1-one).

The specific examples of the hydroxyketones photoinitiators include for example commercially obtained Darocure 1173 (HMPP), Darocure 2959 (HHMP) and Darocure 184 (chemical name: 1-hydroxycyclohexyl benzophenone, ab. HCPK) and the like.

The specific examples of the aminoketones photoinitiators include for example commercially obtained Irgacure 907 (chemical name: 2-methyl-1-[4-(methylthio)-phenyl]-2-morpholinopropan-1-one, ab. MMMP), Irgacure369 (BDMB) and the like.

The specific examples of the acyl phosphine peroxides photoinitiators include for example commercially obtained TEPO (chemical name: ethyl 2,4,6-trimethylbenzoyl-phenylphosphinate), TPO (chemical name: trimethylbenzoyl diphenylphosphine oxide) and Irgacure 819 (chemical name: phenyl bis(2,4,6-trimethylbenzoyl)phosphine oxide, ab. BAPO, commercially from Ciba Specialty Chemicals Inc.) and the like.

Preferably the photo-polymerization initiator is selected from the group consisting of 1-Hydroxycyclohexyl-phenyl-ketone (Irgacure 184), 2,4,6-trimethylbenzoyldiphenylphosphine oxide (TPO), 2,4,6-trimethylbenzoylphenyl phosphinate (TPO-L), Bis(2,4,6-trimethylbenzoyl)-phenylphosphineoxide (Irgacure 819), 2-Benzyl-2-dimethylamino-1-(4-morpholinophenyl)butanone-1 (Irgacure 369), 2-Dimethylamino-2-(4-methyl-benzyl)-1-(4-morpholin-4-yl-phenyl) butan-1-one (Iragcure 379), 1-[4-(Phenylthio)phenyl]-1,2-octanedione 2-(0-benzoyloxime) (OXE-01), 1-[9-Ethyl-6-(2-methylbenzoyl)-9H-carbazol-3-yl]-ethanone-1-(0-acetyloxime) (OXE-02).

The adhesive formulations of the invention may contain one photoinitiator, or two or more photoinitiators may also be used in combination.

Adhesive formulations according to the present invention preferably comprises photopolymerization initiators in amounts from 0 to 5% by weight, more preferably from 1 to 5% by weight, especially preferred from 2 to 5% by weight, based on the total weight of the formulation of the invention.

Besides the components mentioned above, the adhesive formulations of the invention may also comprise other auxiliaries such as photo stabilizers, thermol stabilizers, photo-initiated promoters, thermal-initiated promoters, leveling agents, tougheners, thickeners, anti yellowing agents and the like.

The use of anti yellowing agents is well described in the literature and any expert trained in the art would be able to further improve the yellowing by addition of such agents.

These auxiliaries may be added in a suitable amount depending on the specific requirements to the adhesive properties. In the adhesive composition of the invention, the amount of the auxiliaries is in a range of 0.01 wt. % to 1 wt. %, or 1 wt. % to 2 wt. %, or 0 wt. % to 2 wt. %.

A preferred formulation of this invention, preferably an adhesive formulation that can be used as liquid optically clear adhesives (LOCA), comprises therefore
1) 20 to 80 wt.-% of acrylate terminated urethane polybutadienes, wherein the acrylate terminated urethane polybutadienes are obtained by reaction of
   A) at least one low-monomer-content 1:1 monoadduct, having a free diisocyanate content of less than 2% by weight, the monoadduct being based on at least one aliphatic, cycloaliphatic and/or araliphatic diisocyanate a1) and at least one reactive olefinic compound having at least one methacrylate group and/or acrylate group and/or vinyl ether group and exactly one OH group a2), and
   B) at least one hydroxyterminated polybutadiene
   C) optionally in the presence of at least one polymerization inhibitor and
2) a liquid component selected from 30 to 70 wt.-% of at least one plasticizer and/or 5 to 30 wt.-% of reactive (meth)acrylates, and
3) 0.5 to 5 wt.-% of photo-polymerization initiators.

The sum of the proportions of all components must add to 100 wt. %.

The formulations of the present invention, preferably the adhesive formulations, can be used for bonding or laminating various substrates, for example various components in a display, especially in the assembly of optical components, or the bonding or laminating between optically transparent substrates and between an optically transparent substrate and an opaque substrate. The optically transparent substrates include, for example, glass or optically transparent plastic or the like; the opaque substrates include, for example, metal, opaque plastic, ceramics, stone, leather or wood, etc. Using the adhesive composition of the present invention for bonding or laminating glass substrate-to-glass substrate is the most preferred.

The adhesive formulation of the invention can be applied to regions to be sealed or substrates to be bonded by conventional methods known in the art. The adhesive formulation of the invention has an excellent bonding effect to glass and plastic substrates.

Another subject matter of this invention is a process for binding a top substrate to a base substrate, in which
  (a) the formulation, preferably the adhesive formulation, as described before, is applied onto the top side of the base substrate,
  (b) the top substrate is attached on the adhesive layer of step (a),
  (c) the formulation, preferably the adhesive formulation, is hardened by exposure to electromagnetic radiation comprising a wavelength ranging from 200 nm to 700 nm, preferably from 250 nm to 500 nm.

Another subject matter of this invention is a process for binding a top substrate to a base substrate, in which
  (a) the formulation, preferably the adhesive formulation, as described before, is applied onto the top side of the base substrate,
  (b) the formulation, preferably the adhesive formulation is cured by exposure to electromagnetic radiation comprising a wavelength ranging from 200 nm to 700 nm, preferably from 250 nm to 500 nm to form a gel layer,
  (c) the top substrate is attached an the tacky gel layer of step (b),
  (d) optionally, the formulation, preferably the adhesive formulation, is fully cured by exposure to electromagnetic radiation comprising a wavelength ranging from 200 nm to 700 nm, preferably from 250 nm to 500 nm.

Step (d) is only necessary, when the degree of cure of the liquid optically clear photo-curable adhesive after the curing step (b) is too low (for example degree of cure <60%) to provide adequate adhesive strength.

It is also possible, that the liquid optically clear photo-curable adhesive formulation is fully cured after the curing step (b).

In both processes for binding a top substrate to a base substrate, the liquid optically clear photo-curable adhesive should be applied onto the top side of the base substrate such that preferably a 10 μm to 600 μm thick layer of a liquid optically clear adhesive results. Preferably, a continuous layer of the adhesive should be applied.

After applying the adhesive of the invention onto predetermined regions, UV-irradiation may be conducted firstly, which leads to fast curing of the adhesive an light-reachable areas, for example, within 5 to 60 seconds.

In order to cure the adhesive an shadow areas, a portion or whole of bonded or sealed parts may be placed under a relatively high temperature, for example 80° C. Thermol curing generally requires a relatively long time, for example, more than 10 minutes to one hour.

For parts easy to be embrittled and to be damaged at a higher temperature, the adhesive of the invention also provides a possibility to cure the adhesive an shadow areas at normal temperature. The time of moisture-curing normally is longer than that of thermal-curing. Sometimes, it may take as long as one day to achieve complete curing.

According to different applications and production processes, the adhesive of the invention can be cured with any combination of the three curing ways. For example, the adhesive of the invention can be cured via UV curing or thermol curing or moisture curing alone, or can be cured via the combination of UV curing and thermol curing, of thermol curing and moisture curing, or of moisture curing and thermol curing. The order of different curing ways could be adjusted according to the actual conditions.

Therefore, the formulations of the invention provides very flexible curing ways for the operators, and brings considerable convenience to the adhesion, assembly and sealing of electronic elements.

UV-radiation can preferably be supplied using a high intensity continuously emitting system such as those available from Fusion UV Systems. A metal halide lamp, LED lamp, high-pressure mercury lamp, xenon lamp, Xenon flash lamp etc. can be used for UV-radiation. UV energy should be around 100 to 5,000 mJ/cm$^2$.

The "base substrate" in the context of this invention means the substrate, an which a top substrate will be attached to. The "base substrate" can be a display panel, for example, or a LCD. The optically clear photo-curable adhesive will be preferably applied an the top side of the base substrate. The "top substrate" is for example a cover lens.

The application of the optically clear photo-curable adhesive formulation an the top side of the base substrate, which can be a display panel for example, can be done in the usual way, for example by a single or multi nozzle or a slit coater.

The top substrate, which is preferably a substantially transparent substrate, is attached to the gelled or liquid adhesive layer preferably under ambient condition or under vacuum condition. Vacuum conditions are especially preferred to guarantee the best possible bubble-free bonding. If vacuum conditions are used, then the vacuum level should preferably be around <100 Pa, preferably <10 Pa.

As used herein, "substantially transparent" refers to a substrate that is suitable for optical applications, e.g., has at least 85% transmission over the range of from 380 to 780 nm.

According to a preferred embodiment of the invention the top side of the base substrate is selected from glass and polymer, preferably plastic films, including in particular polyethylene terephthalate, polymethyl (meth)acrylate, and/or triacetate cellulose (TAC). A plastic film is a thin sheet of (preferably polymer and preferably transparent) material used to cover things. A preferred base substrate is a LCD module with polarizer film an top. In a further preferred case the TAC is the top surface of the polarizer. So, in such case, the adhesive will be directly bonded to the TAC surface.

According to another preferred embodiment of the invention the side of the top substrate, which shall be bonded, which is preferably a transparent substrate, is selected from glass and polymer, preferably plastic films, including in particular polyethylene terephthalate, polymethyl (meth) acrylate, and/or TAC.

The base substrate can be a display panel, preferably selected from a liquid crystal display, a plasma display, a light-emitting diode (LED) display, an electrophoretic display, and a cathode ray tube display, according to another preferred embodiment of the invention. It is especially preferred that the display panel has touch functionality.

According to another preferred embodiment the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example for 3D TV applications, a glass or film retarder will be bonded onto a LCD for passive 3D TV, or a TN LCD or lenticular lens is bonded a regular TFT LCD for naked eye 3D.

The adhesive formulation of our invention as well as the process of our invention can be used for any touch panel sensor assembly. They can preferably be used to band touch panel sensors that require two layers of indium-tin-oxide coated glass. They can preferably be used for cover lens bonding, in particular to fill the air gap in touch panel sensors that utilize a cover lens (such as clear plastic polymethyl (meth)acrylate) and the glass touch panel sensor.

They can preferably be used for direct bonding, preferably to directly band the cover lens to a LCD module.

Of course our invention comprises the possibility that two or more top substrates are bonded one after another on a base substrate, for example starting with a LCD as the base substrate, then bonding one layer of indium-tin-oxide coated glass on the base substrate with help of the liquid optically clear photo-curable adhesive, after that bonding another layer of indium-tin-oxide coated glass on it with the help liquid optically clear photo-curable adhesive, after this bonding a cover lens on it with the help liquid optically clear photo-curable adhesive.

A further subject matter of the present invention is a process of making an optical assembly comprising:
 (a) providing a display panel and a top substrate,
 (b) disposing the formulation, preferably the liquid optically clear photo-curable adhesive, as described above, on the display panel,
 (c) curing the formulation, preferably the liquid optically clear photo-curable adhesive, by exposing it to electromagnetic radiation comprising a wavelength ranging from 200 nm to 700 nm, preferably from 250 nm to 500 nm to form a gel layer,
 (d) applying the top substrate on the gelled adhesive layer of step (e),
 (e) optionally exposing the optical assembly to electromagnetic radiation comprising a wavelength ranging from 200 nm to 700 nm, preferably from 250 nm to 500 nm to fully cure the formulation.

As explained above, step (e) is only necessary, when the degree of cure of the liquid optically clear photo-curable adhesive after the curing step (e) is too low, for example <60%.

It is also possible, that the liquid optically clear photo-curable adhesive is fully cured after the curing step (b).

A further subject matter of the present invention is a process of making an optical assembly comprising:
 (a) providing a display panel and a top substrate,
 (b) disposing the liquid optically clear photo-curable adhesive, as described above, on the display panel,
 (c) applying the top substrate on the adhesive layer of step (b),
 (e) exposing the optical assembly to electromagnetic radiation comprising a wavelength ranging from 200 nm to 700 nm, preferably from 250 nm to 500 nm to fully cure the adhesive.

Another subject matter of this invention is the use of the inventive liquid adhesive formulation on liquid crystal displays to fix the touch screen on the base substrate. The base substrate can be a display panel, preferably selected from a liquid crystal display, a plasma display, a light-emitting diode (LED) display, an electrophoretic display, and a cathode ray tube display.

According to another preferred embodiment of the invention the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example for 3D TV applications, a glass or film retarder will be bonded onto a LCD for passive 3D TV, or a TN LCD or lenticular lens is bonded a regular TFT LCD for naked eye 3D. The use of said liquid optically clear photo-curable adhesive for bonding parts of optical assemblies is another subject matter of this invention. The use of the inventive liquid optically clear photo-curable adhesive formulation for touch panel sensor assembly, preferably to band touch panel sensors that require two layers of ITO (indium-tin-oxide) coated glass is another subject matter of this invention.

The use of said liquid optically clear photo-curable adhesive for cover lens bonding, preferably to fill the air gap in touch panel sensors that utilize a cover lens and the glass touch panel sensor is another subject matter of this invention. The use of said liquid optically clear photo-curable adhesive for directly bonding the cover lens to a LCD module is another subject matter of this invention.

In the present invention, conversion of low-monomer 1:1 monoadducts and hydroxy-terminated polybutadienes yields products in which the solution viscosity of the formulation is more than 10% lower, preferably more than 15% lower, and most preferably more than 20% lower than that of the state of the art.

The products described here can be used in various applications, such as adhesives, coatings, sealants, plastics, and composites. Its favorable optical properties and low solution viscosity make this combination particularly suitable for optical applications, especially for LOCAs. Our invention is applicable in all fields of mobile phone, tablet PC, TV, notebook PC, digital camera, photo frame, car navigation, outdoor display etc.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Methods

Gel Permeation Chromatography (GPC)

Measurements were conducted at 40° C. in tetrahyrdofurari (THF) at a concentration of 1 g/L and a flow rate of 0.3 mL/min. A PSS SDV Micro precolumn (5μ/4.6×30 mm) and a PSS SDV Micro linear S separation column (5μ/4.6×250 mm, 2×) were used for chromatographic separation. An RI detector was used for detection. A polybutadiene standard (PSS Kit polybutadiene-1,4, Mp 831-106000; part No.: PSS-bdfkit, Mn: 1830/4330/9300/18000/33500) was used for calibration purposes.

Molecular weights Mn and Mw were determined via computer-assisted analysis of the chromatograms. The polydispersity index (PDI) is defined as Mn divided by Mw.

Viscosity Determination

Viscosities (cone plate) were determined for the materials as specified in DIN 53018, using a Physica MCR 301 rheometer from Anton Paar Germany GmbH.

NCO Content

Measurements were conducted using a titrator (Metrohm Titrando 905) and an n-butylamine solution (1 N).

Monomer Content (% IPDI)

The residual IPDI content was determined via GC (gas chromatography). A fused silica capillary column was used for chromatographic separation. An FID detector was used for detection. IPDI and n-tetradecane (internal standard) were used for calibration purposes.

Refractive Index

The refractive index of liquid compositions was measured with an ATAGO ABBE REFRACTOMETER.

Tg (DSC)

The glass transition temperature (Tg) was measured with a Hitachi DSC 7000X, with the temperature ramp set to 20° C./min.

Storage Modulus and Loss Modulus

Storage modulus and loss modulus were measured by TA; model Q800. With a temperature ramp 2° C./min. all the sample size for measurement was designed by 1 cm×3 cm×0.1 cm (length×width×thickness) and was full cured by UV radiation.

Adhesion

Adhesion (shear force) was measured with a Shimadzu AG-A with a 100N load cell and the pulled speed is 25 mm/min. all the measurement were recorded in kgf/cm2. The samples for measurement were prepared as follows. A gap with 1 cm×1 cm (length×width) and 125 um thick PET film was placed around the one side edge of the bottom substrate (glass; 12 cm×2.5 cm×0.2 cm in length×width×thickness), The LOCA was placed in the gap and the top substrate (glass; 12 cm×2.5 cm×0.2 cm in length×width×thickness) was placed on the top of LOCA, the sample was cured by UV radiation for a total UV dosage of 3000 mJ/cm$^2$.

Optical Properties

Optical properties (redshift (−a*), yellowing (b*), haze (%), transmittance (%)) were measured with an UltraScan VIS from Hunter Associate Lab, Inc. The samples for optical properties measurement were prepared as follows. A gap with 5 cm×5 cm (length×width) and 125 um thick PET film was placed around the edge of the bottom substrate (glass), The LOCA was placed in the gap and the top substrate was placed on the top of LOCA, the sample was cured by UV radiation for a total UV dosage of 3000 mJ/cm2. All the optical properties of the compositions were measured by sandwiching the composition between two glasses Thermal Stability Test (150° C. and 200° C.)

Thermol stability was measured by detecting the change of optical properties after high temperature treatment. The samples for optical properties measurement were prepared as follows. A gap with 5 cm×5 cm (length×width) and 125 um thick PET film was placed around the edge of the bottom substrate (glass), the LOCA was placed in the gap and the top substrate was placed on the top of LOCA, the sample was cured by UV radiation with a total UV dosage of 3000 mJ/cm$^2$. Then those samples were stored in an oven at 150° C. or 200° C. for 60 minutes, respectively. All the optical properties of the compositions were measured by sandwiching the composition between two glasses.

Accelerated Aging Test (at 60° C., 90% RH)

Accelerated aging test was measured by testing the change of optical properties after storage at constant temperature and humidity for 500 hours. The samples for optical properties measurement were prepared as follows: a gap with 5 cm×5 cm (length×width) and 125 um thick PET film was placed around the edge of the bottom substrate (glass), the LOCA was placed in the gap and the top substrate was placed an the top of LOCA. The sample was cured by UV radiation with a total UV dosage of 3000 mJ/cm2, then the PET edge film was removed. Those samples were stored at a constant temperature and humidity in a chamber at 60° C. and 90% relative humidity for 500 hours. All the optical properties of the compositions were measured by sandwiching the composition between two glasses.

Adhesion after 180 Degree Bending 20 Times

Adhesion test was evaluated by visual checking the delamination after bending. The samples were prepared by coating the LOCA composition an the PET film for an area around 20 cm×20 cm. A second PET film was placed an top of LOCA, then the sample was cured by UV radiation with a total UV dosage of 3000 mJ/cm². The thickness of cured LOCA was 250 μm±5 μm. Those samples were then bended to 180 degree by hand for total 20 times, and the assessment was determined with GOOD if no delamination and BAD if any delamination between two PET films was observed.

| Used products | Product description, producer |
|---|---|
| IPDI | Isophorondiisocyanat, Evonik Resource Efficiency GmbH, Coatings & Additives |
| HEA | Hydroxyethylacrylate, Aldrich |
| DBTL | Dibutylzinndilaurate, Urethane catalyst, Aldrich |
| POLYVEST ® HT | Hydroxy functionallized Polybutadien, Polydispersity PD = 2, 10, Evonik Resource Efficiency GmbH, OH Number = 46-50 mg KOH/g |
| BHT | 4-methyl-2,6-di-tert.-butylphenol |
| VESTANAT® EP DC 1241 | Low monomer 1:1 monoadduct from IPDI and HEA, Monomer content IPDI 0.05%, Evonik Resource Efficiency GmbH, |
| BR-3641 | Acrylate-terminated urethane polyether oligomer, from Dymax Corp. functionality: 1.3, viscosity(cP): 24,000 at 50° C. |
| BRC-843 | Hydrophobie acrylate-terminated urethane oligomer, from Dymax Corp. functionality: 2.0, viscosity(cP): 90,000 at 25° C. |
| BR-6410 | Acrylate-terminated urethane polybutadiene oligomer, from Dymax Corp. functionality: 2.0, viscosity(cP): 15,000 at 60° C. |
| YH-PBA | Acrylate-terminated polybutadiene oligomer, from Cray Valley Corp. functionality:2.0, viscosity(cP): 30,000 at 25° C. |
| IBOA | Isobornyl acrylate, from Evonik Industries AG. (CAS: 5888-33-5) |
| Visiomer ® 98 | 2-Hydroxyethyl methacrylate, from Evonik Industries AG. (CAS: 868-77-9) |
| Irgacure ® 184 | 1-Hydroxycyclohexyl phenyl ketone, from Ciba Specialty Chemicals Corp. (CAS: 947-19-3) |
| TPO | Diphenyl (2,4,6-Trimethylbenzoyl) phosphine oxide, from Chembridge International Corp. (CAS: 75980-60-8) |

Example A

Preparation of a Conventional Acrylate-Terminated Urethane Polybutadiene, not According to the Invention (Oligomer Comparison)

a1)

2.2 g (0.5 wt. %) BHT is added to a vigorously stirred mixture of 222 g (1 mol) IPDI and 0.05 g (DBTL), to which 116 g (1 mol) hydroxyethyl acrylate (HEA) is added dropwise while feeding dry air over the solution. Once addition is complete, the solution is stirred at 70° C. until the alcohol components of the hydroxyethyl acrylate have been fully converted (generally 2-4 h). Dry air is fed over the mixture during this reaction phase as well. The NCO content of the product is 11.8%.

a2)

Next, 77.11 g POLYVEST® HT and 0.05 wt. % of the catalyst (DBTL) were heated to 60° C. under nitrogen in a three-neck round-bottom flask fitted with a dropping funnel and a thermometer. Once the temperature had been reached, 22.85 g of the product of IPDI and HEA described in A) was added through the dropping funnel while stirring; the reaction mixture was stirred for three hours. The end of the reaction was detected by determining the residual isocyanate content (NCO<0.1 wt. %) via titration.

GPC (polystyrene standard): $M_n$=3.206 g/mol; $M_w$=10.180 g/mol.

Example B

Preparation of an Acrylate-Terminated Urethane Polybutadiene Using a Low-Monomer 1:1 Monoadduct, According to the Invention (POLYVEST® EP-AT)

77.11 g POLYVEST HT and 0.05 wt. % of the catalyst (DBTL) were heated to 60° C. under nitrogen in a three-neck round-bottom flask fitted with a dropping funnel and a thermometer. Once the temperature had been reached, 22.85 g VESTANAT® EP DC 1241 (NCO content: 11.6%; IPDI content: 0.05 wt. %) was added through the dropping funnel while stirring; the reaction mixture was stirred for three hours. The end of the reaction was detected by determining the residual isocyanate content (NCO<0.1 wt. %) via titration.

GPC (polystyrene standard): $M_n$=3.716 g/mol; $M_w$=7.165 g/mol.

Examples C and D

Preparation of a Formulation with POLYVEST®-EP-AT, According to the Invention

The amount of acrylate-terminated urethane polybutadiene indicated in table 1 (example B) was placed in a flask along with IBOA and Visiomer® 98. Irgacure® 184 and TPO were added to this and the mixture was homogenized for one hour at 60° C. Table 1 shows the main properties of the formulations.

Examples E and F

Preparation Formulation (Oligomer Comparison), not According to the Invention

The amount of acrylate-terminated urethane polybutadiene indicated in table 1 (example A) was placed in a flask along with IBOA and Visiomer® 98. Irgacure® 184 and TPO were added to this and the mixture was homogenized for one hour at 60° C. Table 1 shows the main properties of the formulations.

Examples G to J

Preparation of Cured Films from Examples C to F

Formulations C to F were placed between two glass plates and cured under UV light (energy=3,000 mJ/cm². The optical properties were then measured. The results are shown in table 2

TABLE 1

|  | Examples | | Comparative Examples | |
| --- | --- | --- | --- | --- |
|  | C | D | E | F |
| Polyvest ®-EP-AT | 77.68 | 58.25 | — | — |
| Comparative Oligomer | — | — | 77.68 | 58.25 |
| IBOA | 14.56 | 29.13 | 14.56 | 29.13 |
| Visiomer ® 98 | 4.85 | 9.71 | 4.85 | 9.71 |
| Irgacure ® 184 | 1.94 | 1.94 | 1.94 | 1.94 |
| TPO | 0.97 | 0.97 | 0.97 | 0.97 |
| Viscosity (cP) @ 25° C. | ~16,000 | ~28,000 | ~22,000 | ~3,900 |
| Viscosity decrease compared to state of the art | 27% | 28% |  |  |
| Refractive Index | 1.508 | 1.499 | 1.507 | 1.495 |

|  | Examples | | | |
| --- | --- | --- | --- | --- |
| Cure Film | G | H | I | J |
| Formulation | C | D | E | F |
| Full cure energy (mJ/cm$^2$) | 3,000 | 3,000 | 3,000 | 3,000 |
| Tg (° C.) | 28 | 32 | 26 | 27 |
| Adhesion (Shear strength; kgf/1 cm$^2$) | >10 | >10 | >10 | >10 |
| Brightness (L*) | 96.2 | 96.2 | 96.2 | 96.2 |
| Redshift (-a*) | 0.39 | 0.30 | 0.34 | 0.33 |
| Yellowing (b*) | 0.68 | 0.63 | 0.62 | 0.61 |
| Haze (%) | 0.1 | 0.1 | 0.2 | 0.1 |
| Transmittance (%) | 90.5 | 90.5 | 91.0 | 90.9 |

The results in this table demonstrate that formulations prepared with acrylate-terminated urethane polybutadienes (as shown in example B) from low-monomer 1:1 monoadducts yield a solution viscosity over 20% lower than that of the state of the art (table 1), while required LOCA properties such as transmittance, color, adhesion, etc. all remain within specifications (table 2).

Example 1

An adhesive formulation was prepared with 77.68 parts by weight of acrylate terminated urethane polybutadienes according to example B, 14.56 parts by weight of isobornyl acrylate (Evonik Industries AG.), and 4.85 parts by weight of 2-Hydroxyethyl methacrylate (Evonik Industries AG.) as reactive monomer were added into a flask, this mixture with 1.94 part by weight of Irgacure® 184 (Ciba Specialty Chemicals Corp.) and 0.97 part by weight of TPO (Chembridge International Corp.) as photopolymerizable initiators was uniformly mixed under 60° C. for 1 hour.

Comparative Example 1

An adhesive formulation was prepared with 77.68 parts by weight of polyether urethane acrylate (BR-3641, Bomar) as a oligomer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

Comparative Example 2

An adhesive formulation was prepared with 77.68 parts by weight of hydrophobic urethane acrylate (BRC-843, Bomar) as a oligomer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

Comparative Example 3

An adhesive formulation was prepared with 77.68 parts by weight of polybutadiene urethane acrylate (BR-641 D, Bomar) as a oligomer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

Comparative Example 4

An adhesive formulation was prepared with 77.68 parts by weight of polybutadiene urethane acrylate (YH-PBA, Yuang Hong) as a oligomer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

The composition of obtained adhesives and their properties are shown in table 3.

TABLE 3

|  | Example | Comparative example | | | |
| --- | --- | --- | --- | --- | --- |
|  | 1 | 1 | 2 | 3 | 4 |
| Oligomers [wt. %] |  |  |  |  |  |
| Acrylate terminated urethane polybutadienes according to example B | 77.68 |  |  |  |  |
| BR-3641 |  | 77.68 |  |  |  |
| BRC-843 |  |  | 77.68 |  |  |
| BR-641D |  |  |  | 77.68 |  |
| YH-PBA |  |  |  |  | 77.68 |
| Monomers [wt. %] |  |  |  |  |  |
| IBOA | 14.56 | 14.56 | 14.56 | 14.56 | 14.56 |
| Visiomer 98 | 4.85 | 4.85 | 4.85 | 4.85 | 4.85 |
| Photo-initiators [wt. %] |  |  |  |  |  |
| Irgacure 184 | 1.94 | 1.94 | 1.94 | 1.94 | 1.94 |
| TPO | 0.97 | 0.97 | 0.97 | 0.97 | 0.97 |
| Properties |  |  |  |  |  |
| Brightness (L*) | 95.5 | 96.3 | 96.4 | 96.4 | 96.5 |
| Redshift (-a*) | 0.20 | 0.70 | 0.65 | 0.65 | 0.40 |
| Yellowing (b*) | 0.70 | 1.58 | 1.20 | 1.02 | 0.57 |
| Haze (%) | 0.4 | 2.8 | 0.2 | 0.2 | 0.2 |
| Transmittance (%) | 91.3 | 90.5 | 91.1 | 91.3 | 91.3 |

The example 1 in table 3, acrylate terminated urethane polybutadienes according to example B in the LOCA formulation, shows a good performance of optical properties. Compare to various commercial products, example 1 has especially the lowest redshift and a low yellowing index. This presents a high potential application of such material when used to improve the optical characteristics of the device.

Example 2

An adhesive formulation was prepared with 58.25 parts by weight of acrylate terminated urethane polybutadienes according to example B, 19.43 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture with 1.94 part by weight of Irgacure 184 (Ciba Specialty Chemicals Corp.) and 0.97 part by weight of TPO (Chembridge International Corp.) as photopolymerizable initiators was uniformly mixed under 60° C. for 1 hour.

Comparative Example 5

An adhesive formulation was prepared with 58.25 parts by weight of polyether urethane acrylate (BR-3641, Bomar) as a oligomer, 19.43 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

Comparative Example 6

An adhesive formulation was prepared with 58.25 parts by weight of hydrophobic urethane acrylate (BRC-843, Bomar) as a oligomer, 19.43 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

Comparative Example 7

An adhesive formulation was prepared with 58.25 parts by weight of polybutadiene urethane acrylate (BR-641 D, Bomar) as a oligomer, 19.43 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

Comparative Example 8

An adhesive formulation was prepared with 58.25 parts by weight of polybutadiene urethane acrylate (YH-PBA, Yuang Hang) as a oligomer, 19.43 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture was uniformly mixed as 1.94 part by weight of photopolymerizable initiators Irgacure184 (Ciba Specialty Chemicals Corp.) and 0.97 part by weight of TPO (Chembridge International Corp.) as photopolymerizable initiators was uniformly mixed under 60° C. for 1 hour.

The composition of obtained adhesives and their properties are shown in table 4.

TABLE 4

| | Example | Comparative example | | | |
|---|---|---|---|---|---|
| | 2 | 5 | 6 | 7 | 8 |
| Oligomers [wt.-%] | | | | | |
| Acrylate terminated urethane polybutadienes according to example B | 58.25 | | | | |
| BR-3641 | | 58.25 | | | |
| BRC-843 | | | 58.25 | | |
| BR-641D | | | | 58.25 | |
| YH-PBA | | | | | 58.25 |
| Liquid rubber [wt.-%] | | | | | |
| Polyvest 110 | 19.43 | 19.43 | 19.43 | 19.43 | 19.43 |
| Monomers [wt.-%] | | | | | |
| IBOA | 14.56 | 14.56 | 14.56 | 14.56 | 14.56 |
| Visiomer 98 | 4.85 | 4.85 | 4.85 | 4.85 | 4.85 |
| Photo-initiators [wt.-%] | | | | | |
| Irgacure 184 | 1.94 | 1.94 | 1.94 | 1.94 | 1.94 |
| TPO | 0.97 | 0.97 | 0.97 | 0.97 | 0.97 |
| Properties | | | | | |
| Yellowing (b*) | 0.6 | Fail[1] | Fail[1] | Fail[2] | 1.2 |
| Haze (%) | 0.4 | Fail[1] | Fail[1] | Fail[2] | 2.5 |
| Transmittance (%) | 91 | Fail[1] | Fail[1] | Fail[2] | 90.5 |

[1]Phase separation and high haze
[2]High haze

In consideration of the requirement of application such as higher flexibility with low modulus, higher durability with low yellowing and low haze, etc, the plasticizer is essentially required for the LOCA. Usually, the conventional methods to reduce the modulus is the addition of high amounts of liquid rubber. From the result in table 4, the use of liquid rubber increase the haze in the films due to incompatibilities with the conventionally available oligomers. Therefore, Evonik surprisingly found that the use of Polyvest-EP-AT oligomer has superior compatibility with liquid rubber and allows to make cured films with excellent optical performance such as high transmittance, low yellowing index and low haze.

Example 3

An adhesive formulation was prepared with 50.88 parts by weight of acrylate terminated urethane polybutadienes according to example B, 26.80 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture with 1.94 part by weight of Irgacure 184 (Ciba Specialty Chemicals Corp.) and 0.97 part by weight of TPO (Chembridge International Corp.) as photopolymerizable initiators was uniformly mixed under 60° C. for 1 hour.

Example 4

An adhesive formulation was prepared with 38.84 parts by weight of acrylate terminated urethane polybutadienes according to example B, 38.84 parts by weight of liquid rubber (polyvest 110, Evonik Industries AG.) as a plasticizer, 14.56 parts by weight of Isobornyl acrylate (Evonik Industries AG.), and 4.85 parts by weight of 2-Hydroxyethyl methacrylate (Evonik Industries AG.) as reactive monomer were added into a flask, this mixture with 1.94 part by weight of Irgacure 184 (Ciba Specialty Chemicals Corp.) and 0.97 part by weight of TPO (Chembridge International Corp.) as photopolymerizable initiators was uniformly mixed under 60° C. for 1 hour.

Example 5

An adhesive formulation was prepared with 65.54 parts by weight of acrylate terminated urethane polybutadienes according to example B, 21.84 parts by weight of liquid rubber (polyvest 110, Evonik Industries AG.) as a plasticizer, 7.28 parts by weight of Isobornyl acrylate (Evonik Industries AG.), and 2.43 parts by weight of 2-Hydroxyethyl methacrylate (Evonik Industries AG.) as reactive monomer were added into a flask, this mixture with 1.94 part by weight of Irgacure184 (Ciba Specialty Chemicals Corp.) and 0.97 part by weight of TPO (Chembridge International Corp.) as photopolymerizable initiators was uniformly mixed under 60° C. for 1 hour.

Example 6

An adhesive formulation was prepared with 43.69 parts by weight of acrylate terminated urethane polybutadienes according to example B, 43.69 parts by weight of liquid rubber (polyvest 110, Evonik Industries AG.) as a plasticizer, 7.28 parts by weight of Isobornyl acrylate (Evonik Industries AG.), and 2.43 parts by weight of 2-Hydroxyethyl methacrylate (Evonik Industries AG.) as reactive monomer were added into a flask, this mixture with 1.94 part by weight of Irgacure184 (Ciba Specialty Chemicals Corp.) and 0.97 part by weight of TPO (Chembridge International Corp.) as photopolymerizable initiators was uniformly mixed under 60° C. for 1 hour.

Example 7

An adhesive formulation was prepared with 29.13 parts by weight of acrylate terminated urethane polybutadienes according to example B, 58.25 parts by weight of liquid rubber (polyvest 110, Evonik Industries AG.) as a plasticizer, 7.28 parts by weight of Isobornyl acrylate (Evonik Industries AG.), and 2.43 parts by weight of 2-Hydroxyethyl methacrylate (Evonik Industries AG.) as reactive monomer were added into a flask, this mixture with 1.94 part by weight of Irgacure184 (Ciba Specialty Chemicals Corp.) and 0.97 part by weight of TPO (Chembridge International Corp.) as photopolymerizable initiators was uniformly mixed under 60° C. for 1 hour.

The composition of obtained adhesives and their properties are shown in tables 5-7.

TABLE 5

| | Example | | | | | |
|---|---|---|---|---|---|---|
| | 2 | 3 | 4 | 5 | 6 | 7 |
| Acrylate terminated urethane polybutadienes according to example B [wt. %] | 58.25 | 50.88 | 38.84 | 65.54 | 43.69 | 29.13 |
| Polyvest 110 [wt. %] | 19.43 | 26.80 | 38.84 | 21.84 | 43.69 | 58.25 |
| IBOA [wt. %] | 14.56 | 14.56 | 14.56 | 7.28 | 7.28 | 7.28 |
| Visiomer 98 [wt. %] | 4.85 | 4.85 | 4.85 | 2.43 | 2.43 | 2.43 |
| Irgacure 184 [wt. %] | 1.94 | 1.94 | 1.94 | 1.94 | 1.94 | 1.94 |
| TPO [wt.%] | 0.97 | 0.97 | 0.97 | 0.97 | 0.97 | 0.97 |
| Liquid resin properties | | | | | | |
| Viscosity (cP) @25° C. | 8,600 | 7,000 | 3,100 | 10,800 | 5,800 | 2,450 |
| RI | 1.509 | 1.510 | 1.514 | 1.518 | 1.515 | 1.518 |
| Optical performance of cured resin | | | | | | |
| Yellowing (b*) | 0.60 | 0.48 | 0.51 | 0.56 | 0.50 | 0.54 |
| Haze (%) | 0.40 | 0.45 | 0.60 | 0.50 | 0.50 | 0.40 |
| Transmittance (%) | 91.0 | 91.0 | 90.5 | 91.2 | 91.0 | 91.0 |

All examples in table 5, which are based on acrylate-terminated polybutadiene according to Example B show a good performance of optical properties required by the LOCA application. Moreover, all examples in table e exhibit the suitable refractive index around at 1.51 matched to glass substrate, and therefore the corresponding advantage in improving the anti-glare, anti-reflection while using the display. On the other hand, the viscosity of the formulation can be adjusted via the Polyvest-EP-AT/liquid rubber ratio maintaining the required optical properties and compatibility to the formulation. These results show the widely application's possibilities regardless the increase of liquid rubber.

TABLE 6

| | Example | | | | | |
|---|---|---|---|---|---|---|
| | 2 | 3 | 4 | 5 | 6 | 7 |
| After 150° C. for 60 min | | | | | | |
| Yellowing (b*) | 0.60 | 0.56 | 0.60 | 0.60 | 0.55 | 0.40 |
| Haze (%) | 0.57 | 0.60 | 0.65 | 0.60 | 0.60 | 0.40 |
| Transmittance (%) | 91.0 | 90.0 | 90.5 | 91.2 | 91.3 | 91.5 |
| After 200° C. for 60 min | | | | | | |
| Yellowing (b*) | 0.65 | 0.56 | 0.60 | 0.65 | 0.58 | 0.40 |
| Haze (%) | 0.80 | 0.70 | 0.80 | 0.68 | 0.60 | 0.40 |
| Transmittance (%) | 90.0 | 90.0 | 90.5 | 91.0 | 91.3 | 91.0 |
| After 60° C./90% RH 500 h | | | | | | |
| Yellowing (b*) change (%) | <2 | <2 | <2 | <5 | <5 | <5 |
| Haze change (%) | <2 | <2 | <2 | <5 | <5 | <5 |
| Transmittance change (%) | <2 | <2 | <2 | <5 | <5 | <5 |

Typically, the use of anti-yellowing agents is well described in the literature and any expert trained in the art would be able to further improve the yellowing by addition of such agents. The results of table 6 show that cured films made of acrylate-terminated urethane polybutadiene according to example B exhibit good thermol stability and qualified accelerated aging test by showing the stable optical performance and low yellowing change, even without the use of an additional anti yellowing agent.

TABLE 7

| | Example | | | | | |
|---|---|---|---|---|---|---|
| | 2 | 3 | 4 | 5 | 6 | 7 |
| Storage modulus (MPa) | 20.0 | 7.0 | 4.1 | 6.0 | 4.0 | 2.0 |
| Loss Modulus (MPa) | 8.0 | 2.7 | 1.8 | 2.5 | 2.1 | 0.8 |
| Adhesion after 180 degree bending 20 times | Good | Good | Good | Good | Good | Good |

In contrast with OCA (Optical Clear Adhesives), liquid optical clear adhesive offer an improvement on the wetting of both flat and 3-D substrates and eliminate the need for vacuum lamination and autoclave process in some display preparation (i.e., curved, warped, with ink step feature, etc.). However, one potential concern when using LOCA is the possible high stress development during curing of the adhesive. This stress induced by curing can result in Mura, delamination, bubble formation or other possible failure. to prevent these negative effects, the adhesive composition needs to have certain rheological properties, such as low storage modulus (G'), low loss modulus (G') and no delamination between too substrates. The results in Table 7 show a low modulus and a good substrate adhesion of the adhesive made of acrylate-terminated urethane polybutadiene according to example B, which allow a durable bonding of the laminate.

The results presented in the invention show that acrylate-terminated polybutadiene according to example B exhibit a lower solution viscosity compared to the state of the art. Moreover, these materials when used in LOCA formulations possess good optical properties, high compatibility with liquid rubber and low haze at the same time. Cured films made of them exhibit good thermal stability and good long term reliability as well as low modulus and good adhesion to be apply in flexible displays. These materials have all the required properties to be used as LOCA with the advantages of the lower solution viscosity.

The invention claimed is:

1. A method to make a liquid optically clear adhesive comprising from 20 to 80 wt.-% of acrylate-terminated urethane polybutadienes 1) in formulations in combination with at least one liquid component selected from 30 to 70 wt.-% plasticizer and/or from 5 to 30 wt.-% reactive (meth) acrylates 2), wherein
the acrylate-terminated urethane polybutadienes 1) is made by the method comprising the steps of
A) at least one low-monomer 1:1 monoadduct with a free diisocyanate content below 2.0 wt. %
from
a1) at least one aliphatic, cycloaliphatic, and/or araliphatic diisocyanate
and
a2) at least one reactive olefinic compound having at least one methacrylate group and/or acrylate group and/or vinyl ether group and exactly one OH group
B) with at least one hydroxy-terminated polybutadiene and/or one at least partially or completely hydrogenated hydroxyterminated polybutadiene, and
C) with of at least one polymerization inhibitor
wherein the at least one low-monomer 1:1 monoadduct with a free diisocyanate content below 2.0 wt. % comprises a NCO group wherein the liquid optically clear adhesive is substantially transparent for optical applications wherein the liquid optically clear adhesive has at least 90% transmittance when air is used as a blank measured following the DIN 5033.

2. The method according to claim 1, wherein the ratio of the NCO groups of component A) to the OH groups of component B) ranges from 1.2:1 and 1:40 wherein the liquid optically clear adhesive is substantially transparent for optical applications wherein, after 150° C. for 60 minute, the liquid optically clear adhesive has at least 90% transmission over the range of from 380 to 780 nm and a haze % of from 0.40 to 0.65.

3. The method according to claim 1, wherein the low-content-monomer 1:1 monoadducts A) are prepared, from, as starting compounds,
a1) at least one aliphatic, cycloaliphatic and/or araliphatic diisocyanate in an amount of 1-20 mol, and
a2) 1 mol of at least one reactive olefinic compound having at least one methacrylate group and/or acrylate group and/or vinyl ether group and exactly one OH group, obtained by reaction in a temperature range of 40-120° C., the unreacted diisocyanate being separated off subsequently by a short-path distillation at 80-220° C./0.01-10 mbar from the reaction product,
wherein the short-path distillation takes place in the presence of
a3) at least one inhibitor which possesses at least one functional group reactive toward NCO groups
wherein the liquid optically clear adhesive is substantially transparent for optical applications wherein, after 200° C. for 60 minute, the liquid optically clear adhesive has at least 90% transmittance when air is used as a blank measured following the DIN 5033 and a haze % of from 0.40 to 0.80, and a viscosity at 25° C. of from 2450 cP to 10,800 cP.

4. A liquid optically clear adhesive comprising
1) from 20 to 80 wt.-% of acrylate terminated urethane polybutadienes, wherein the acrylate terminated urethane polybutadienes are obtained by the reaction of
A) a low-monomer-content 1:1 monoadduct, having a free diisocyanate content of less than 2 wt. %, the monoadduct being based on at least one aliphatic, cycloaliphatic and/or araliphatic diisocyanate a1) and at least one reactive olefinic compound having at least one methacrylate group and/or acrylate group and/or vinyl ether group and exactly one OH group a2), and
B) at least one hydroxyterminated polybutadiene and/or one at least partially or completely hydrogenated hydroxyterminated polybutadiene,
C) in the presence of at least one polymerization inhibitor and
2) a liquid component selected from 30 to 70 wt.-% plasticizer and/or from 5 to 30 wt.-% reactive (meth) acrylates, and
3) from 0.5 to 5 wt.-% of a photo-polymerization initiators
wherein the liquid optically clear adhesive is substantially transparent for optical applications wherein the liquid optically clear adhesive has at least 90% transmittance when air is used as a blank measured following the DIN 5033.

5. The liquid optically clear adhesive according to claim 4, wherein the plasticizer is selected from the group consisting of polyisoprene resin, polybutadiene resin, hydrogenated polybutadiene, xylene polymer, hydroxyl-terminated polybutadiene and/or hydroxyl-terminated polyolefin, terpene polymer resin, phthalates, trimellitates, adipates, benzoate ester, hexanoate and dicarboxylate.

6. The liquid optically clear adhesive according to claim 4, wherein the reactive (meth)acrylate is selected from the group consisting of methyl (meth)acrylate, ethyl (meth)acrylate, n- or iso-propyl (meth)acrylate, n- or iso- or tert-butyl (meth)acrylate, 2-(2-ethoxyethoxy) ethyl acrylate, tetrahydrofurfury (meth)acrylate, lauryl acrylate, isooctyl acrylate, isodecyl acrylate, 2-phenoxyethyl acrylate, 2-ethylhexyl (meth)acrylate, isobornyl (meth)acrylate, dicyclopentenyloxyethyl (meth)acrylate, dicyclopentadienyl (meth)acrylate, 2-hydroxyethyl (meth)acrylate, 2-hydroxypropyl (meth)acrylate, 2-hydroxybutyl (meth)acrylate, caprolactone acrylate, morpholine (meth)acrylate, hexanediol di(meth)acrylate, ethyleneglycol dimethacrylate, trimethylolpropane triacrylate, pentaerythritol tetraacrylate and combinations thereof.

7. The liquid optically clear adhesive according to claim 4, wherein the photo-polymerization initiator is selected from the group consisting of 1-Hydroxy-cyclohexyl-phenyl-ketone, 2,4,6-trimethylbenzoyldiphenylphosphine oxide, 2,4,6-trimethylbenzoylphenyl phosphinate, Bis(2,4,6-trimethylbenzoyl)-phenylphosphineoxide, 2-Benzyl-2-dimethylamino-1-(4-morpholinophenyl)-butanone-1, 2-Dimethylamino-2-(4-methyl-benzyl)-1-(4-morpholin-4-yl-phenyl) butan-1-one, 1-[4-(Phenylthio)phenyl]-1,2-octanedione 2-(O-benzyloxime), and 1-[9-Ethyl-6-(2-methylbenzoyl)-9H-carbazol-3-yl]-ethanone-1-(O-acetyloxime).

8. The liquid optically clear adhesive according to claim 4, comprising
1) from 30 to 70 wt.-% of acrylate terminated urethane polybutadienes, wherein the acrylate terminated urethane polybutadienes are obtained by reaction of
A) at least one low-monomer-content 1:1 monoadduct, having a free diisocyanate content of less than 2% by weight, the monoadduct being based on at least one aliphatic, cycloaliphatic and/or araliphatic diisocyanate a 1) and at least one reactive olefinic compound having at least one methacrylate group and/or acrylate group and/or vinyl ether group and exactly one OH group a2), and
B) at least one hydroxyterminated polybutadiene
C) optionally in the presence of at least one polymerization inhibitor and
2) a liquid component selected from 30 to 70 wt.-% of at least one plasticizer and/or from 10 to 25 wt.-% of reactive (meth)acrylates, and
3) from 2 to 5 wt.-% of photo-polymerization initiators
wherein the liquid optically clear adhesive is substantially transparent for optical applications wherein, after 150° C. for 60 minute, the liquid optically clear adhesive has at least 90% transmittance when air is used as a blank measured following the DIN 5033 and a haze % of from 0.40, to 0.65, and a viscosity at 25° C. of from 2450 cP to 10,800 cP.

9. A process for binding a top substrate to a base substrate, in which
(a) the formulations according to claim 4, is applied onto the top side of the base substrate,
(b) the top substrate is attached on the adhesive layer of step (a),
(c) the adhesive is hardened by exposure to electromagnetic radiation comprising a wavelength ranging from 200 nm to 700 nm.

10. The process according to claim 9, wherein the base substrate is a display panel, selected from a liquid crystal display, a plasma display, a light-emitting diode (LED) display, an electrophoretic display, and a cathode ray tube display.

11. The process according to claim 9, wherein the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter.

12. The process for binding a top substrate to a base substrate, in which
(a) the formulations according to claim 4, is applied onto the top side of the base substrate,
(b) the top substrate is attached on the adhesive layer of step (a),
(c) the adhesive is hardened by exposure to electromagnetic radiation comprising a wavelength ranging from 250 nm to 500 nm.

13. The process according to claim 10, wherein the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter.

14. The method according to claim 2, wherein the low-content-monomer 1:1 monoadducts A) are prepared, from, as starting compounds,
a1) at least one aliphatic, cycloaliphatic and/or araliphatic diisocyanate in an amount of 1-20 mol, and
a2) 1 mol of at least one reactive olefinic compound having at least one methacrylate group and/or acrylate group and/or vinyl ether group and exactly one OH group, obtained by reaction in a temperature range of 40-120° C., the unreacted diisocyanate being separated off subsequently by a short-path distillation at 80-220° C./0.01-10 mbar from the reaction product,
wherein the short-path distillation takes place in the presence of
a3) at least one inhibitor which possesses at least one functional group reactive toward NCO groups.

15. The liquid optically clear adhesive according to claim 5, wherein the reactive (meth)acrylates are chosen from methyl (meth)acrylate, ethyl (meth)acrylate, n- or iso-propyl (meth)acrylate, n- or iso- or tert-butyl (meth)acrylate, 2-(2-ethoxyethoxy) ethyl acrylate, tetrahydrofurfury (meth)acrylate, lauryl acrylate, isooctyl acrylate, isodecyl acrylate, 2-phenoxyethyl acrylate, 2-ethylhexyl (meth)acrylate, isobornyl (meth)acrylate, dicyclopentenyloxyethyl (meth)acrylate, dicyclopentadienyl (meth)acrylate, 2-hydroxyethyl (meth)acrylate, 2-hydroxypropyl (meth)acrylate, 2-hydroxybutyl (meth)acrylate, caprolactone acrylate, morpholine (meth)acrylate, hexanediol di(meth)acrylate, ethyleneglycol dimethacrylate, trimethylolpropane triacrylate, pentaerythritol tetraacrylate and combinations thereof.

16. The liquid optically clear adhesive according to claim 5, wherein the photo-polymerization initiator is selected from the group consisting of 1-Hydroxy-cyclohexyl-phenyl-ketone, 2,4,6-trimethylbenzoyldiphenylphosphine oxide, 2,4,6-trimethylbenzoylphenyl phosphinate, Bis(2,4,6-trimethylbenzoyl)-phenylphosphineoxide, 2-Benzyl-2-dimethylamino-1-(4-morpholinophenyl)-butanone-1, 2-Dimethylamino-2-(4-methyl-benzyl)-1-(4-morpholin-4-yl-phenyl)

butan-1-one, 1-[4-(Phenylthio)phenyl]-1,2-octanedione 2-(O-benzoyloxime), 1-[9-Ethyl-6-(2-methylbenzoyl)-9H-carbazol-3-yl]-ethanone-1-(O-acetyloxime).

17. The liquid optically clear adhesive according to claim 5, comprising
1) from 30 to 70 wt.-% of acrylate terminated urethane polybutadienes, wherein the acrylate terminated urethane polybutadienes are obtained by reaction of
A) at least one low-monomer-content 1:1 monoadduct, having a free diisocyanate content of less than 2% by weight, the monoadduct being based on at least one aliphatic, cycloaliphatic and/or araliphatic diisocyanate a 1) and at least one reactive olefinic compound having at least one methacrylate group and/or acrylate group and/or vinyl ether group and exactly one OH group a2), and
B) at least one hydroxyterminated polybutadiene
C) optionally in the presence of at least one polymerization inhibitor and
2) a liquid component selected from 30 to 70 wt.-% of at least one plasticizer and/or from 10 to 25 wt.-% of reactive (meth)acrylates, and
3) from 2 to 5 wt.-% of photo-polymerization initiators
wherein the liquid optically clear adhesive is substantially transparent for optical applications wherein, after 200° C. for 60 minute, the liquid optically clear adhesive has at least 90% transmittance when air is used as a blank measured following the DIN 5033 and a haze % of from 0.40 to 0.80 and a viscosity at 25° C. of from 2450 cP to 10,800 cP.

18. A process for binding a top substrate to a base substrate, in which
(a) the formulation, as described in claim 5, is applied onto the top side of the base substrate,
(b) the top substrate is attached on the adhesive layer of step (a),
(c) the adhesive is hardened by exposure to electromagnetic radiation comprising a wavelength ranging from 200 nm to 700 nm.

19. The process according to claim 18, wherein the base substrate is a display panel, selected from a liquid crystal display, a plasma display, a light-emitting diode (LED) display, an electrophoretic display, and a cathode ray tube display.

20. The process according to claim 19, wherein the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter.

21. The method according to claim 1, wherein the polybutadiene B) has terminal hydroxyl groups, where the polybutadiene comprises the 1,3-butadiene-derived monomer units

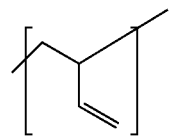
(I)

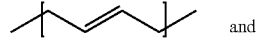
(II) and

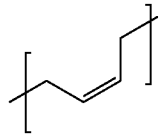
(III)

where the proportion of (I) in the entirety of the 1,3-butadiene-derived monomer units present in the polybutadiene is from 10 to 60 mol percent, and where the sum of the proportions of (II) and (III) in the entirety of the 1,3-butadiene-derived monomer units present in the polybutadiene is from 40 to 90 mol percent.

22. The liquid optically clear adhesive according to claim 4, wherein the polybutadiene B) has terminal hydroxyl groups, where the polybutadiene comprises the 1,3-butadiene-derived monomer units

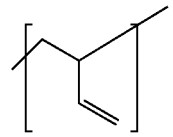
(I)

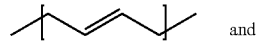
(II) and

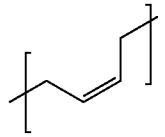
(III)

where the proportion of (I) in the entirety of the 1,3-butadiene-derived monomer units present in the polybutadiene is from 10 to 60 mol percent, and where the sum of the proportions of (II) and (III) in the entirety of the 1,3-butadiene-derived monomer units present in the polybutadiene is from 40 to 90 mol percent.

* * * * *